(12) United States Patent
Harfert (10) Patent No.: US 11,929,604 B2
(45) Date of Patent: Mar. 12, 2024

(54) PROGRAMMABLE VOLTAGE LOCKOUT PROTECTION, AND RELATED SYSTEMS, METHODS AND DEVICES

(71) Applicant: Microchip Technology Incorporated, Chandler, AZ (US)

(72) Inventor: Daniel Harfert, Colorado Springs, CO (US)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 17/443,080

(22) Filed: Jul. 20, 2021

(65) Prior Publication Data
US 2022/0045496 A1    Feb. 10, 2022

Related U.S. Application Data

(60) Provisional application No. 62/706,197, filed on Aug. 4, 2020.

(51) Int. Cl.
*H02H 1/06* (2006.01)
*H02H 1/00* (2006.01)

(52) U.S. Cl.
CPC ............ *H02H 1/06* (2013.01); *H02H 1/0007* (2013.01)

(58) Field of Classification Search
CPC .......... H02H 1/06; H02H 3/006; H02H 3/207; H02H 1/0007; G05F 3/00
See application file for complete search history.

(56) References Cited

U.S. PATENT DOCUMENTS

| | | | | |
|---|---|---|---|---|
| 5,805,401 A | * | 9/1998 | Schuellein | H03K 17/30 361/115 |
| 9,377,805 B2 | * | 6/2016 | Barrett, Jr. | G05F 3/16 |
| 10,387,361 B2 | | 8/2019 | Harfert et al. | |
| 11,056,875 B2 | * | 7/2021 | Hematy | H02M 1/088 |
| 2015/0102856 A1 | * | 4/2015 | Barrett, Jr. | G05F 3/30 327/539 |
| 2019/0387795 A1 | | 12/2019 | Fisher et al. | |
| 2021/0336454 A1 | * | 10/2021 | Hematy | H03K 17/689 |

OTHER PUBLICATIONS

International Search Report from International Application No. PCT/US2021/070913, dated Dec. 11, 2021, 5 pages.
International Written Opinion from International Application No. PCT/US2021/070913, dated Dec. 11, 2021, 6, pages.

* cited by examiner

*Primary Examiner* — Jared Fureman
*Assistant Examiner* — Nicolas Bellido
(74) *Attorney, Agent, or Firm* — TraskBritt (57) ABSTRACT

One or more examples relate, generally, to a programmable voltage lockout circuit provided at an electronic device. Such a programmable voltage lockout circuit asserts a lockout of the electronic device at least partially responsive to a user-programmed threshold and a supply voltage of the electronic device. One or more examples relate, generally, to configuring a programmable voltage lockout circuit utilizing a user-programmed threshold.

25 Claims, 7 Drawing Sheets

PROGRAMMABLE VOLTAGE LOCKOUT PROTECTION, AND RELATED SYSTEMS, METHODS AND DEVICES

This application claims the benefit under 35 U.S.C. § 119(e) of the priority date of U.S. Provisional Patent Application Ser. No. 62/706,197, filed Aug. 4, 2020, the disclosure of which is incorporated herein in its entirety by this reference.

TECHNICAL FIELD

Background

Voltage lockouts are implemented to detect conditions that may initiate response behaviors at electronic devices or electronic systems that include locking out features or functions. As non-limiting examples, a voltage lock out (VLO) block may monitor a voltage signal, compare the voltage signal to a voltage threshold, and perform a response action when the monitored voltage signal is within or outside a threshold voltage level. Non-limiting examples of response actions include enabling or disabling functionality of an integrated circuit (IC), generating a signal (e.g., a flag, interrupt, or event, without limitation) automatically provided, or that is queryable, in order to inform a behavior response block of a same electronic system as the IC of a detected lock-out condition. Signal lockout blocks may be used in numerous operational contexts, including to monitor the quality of power signals and reference signals without limitation.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

In the following detailed description, reference is made to the accompanying drawings, which form a part hereof, and in which are shown, by way of illustration, specific examples of embodiments in which the present disclosure may be practiced. These embodiments are described in sufficient detail to enable a person of ordinary skill in the art to practice the present disclosure. However, other embodiments enabled herein may be utilized, and structural, material, and process changes may be made without departing from the scope of the disclosure.

The illustrations presented herein are not meant to be actual views of any particular method, system, device, or structure, but are merely idealized representations that are employed to describe the embodiments of the present disclosure. In some instances, similar structures or components in the various drawings may retain the same or similar numbering for the convenience of the reader; however, the similarity in numbering does not necessarily mean that the structures or components are identical in size, composition, configuration, or any other property.

The following description may include examples to help enable one of ordinary skill in the art to practice the disclosed embodiments. The use of the terms "exemplary," "by example," and "for example," means that the related description is explanatory, and though the scope of the disclosure is intended to encompass the examples and legal equivalents, the use of such terms is not intended to limit the scope of an embodiment or this disclosure to the specified components, steps, features, functions, or the like.

It will be readily understood that the components of the embodiments as generally described herein and illustrated in the drawings could be arranged and designed in a wide variety of different configurations. Thus, the following description of various embodiments is not intended to limit the scope of the present disclosure, but is merely representative of various embodiments. While the various aspects of the embodiments may be presented in the drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are examples only and should not be construed as the only way to implement the present disclosure unless specified otherwise herein. Additionally, block definitions and partitioning of logic between various blocks are examples of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art will understand that information and signals may be represented using any of a variety of different technologies and techniques. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, units, and circuits described in connection with the embodiments disclosed herein may be implemented or performed with a general purpose processor, a special purpose processor, a digital signal processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein—all of which are encompassed by use of the term "processor." A general-purpose processor may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code, without limitation) related to embodiments of the present disclosure.

The embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, other structure, or combinations thereof. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may include one or more elements.

As used herein, the term "substantially" in reference to a given parameter, property, or condition means and includes to a degree that one of ordinary skill in the art would understand that the given parameter, property, or condition is met with a small degree of variance, such as within acceptable manufacturing tolerances. By way of example, depending on the particular parameter, property, or condition that is substantially met, the parameter, property, or condition may be at least 90% met, at least 95% met, or even at least 99% met.

As used herein, any relational term, such as "over," "under," "on," "underlying," "upper," "lower," etc., is used for clarity and convenience in understanding the disclosure and accompanying drawings and does not connote or depend on any specific preference, orientation, or order, except where the context clearly indicates otherwise.

In this description the term "coupled" and derivatives thereof may be used to indicate that two elements co-operate or interact with each other. When an element is described as being "coupled" to another element, then the elements may be in direct physical or electrical contact or there may be intervening elements or layers present. In contrast, when an element is described as being "directly coupled" to another element, then there are no intervening elements or layers present. The term "connected" may be used in this description interchangeably with the term "coupled," and has the same meaning unless expressly indicated otherwise or the context would indicate otherwise to a person having ordinary skill in the art.

Reusable IC designs ("cells") known to the inventor of this disclosure are typically rated for a specific signal level. As a non-limiting example, some cells known to the inventor of this disclosure are rated for nominal system supply of 3.3 volts, microcontroller supply of 2.7-3.6 volts, analog sensor supply of 3.0-5.5 volts, analog-to-digital converter supply of 2.7-5.5 volts, Wi-Fi module supply of 2.3-3.6 volts, and electronically erasable programmable read-only memory (EEPROM) supply of 1.7 to 5.5 volts. Ratings inform a user (e.g., an electronic system designer) where an IC should be guaranteed to operate (an "operating window"). The inventor of this disclosure appreciates that ICs will often operate outside a guaranteed operating window even though such continued operation may be undesirable.

Ranges of operating voltages for electronic components have diverged due to shrinking geometries of ICs. Acceptable supply voltages for these ICs may be (and often are) lower than acceptable supply voltages for larger components, such as those that do not benefit from lower geometries (e.g., analog ICs, without limitation). As a non-limiting example, there is a trend of shrinking geometries of EEPROM ICs to the extent that such EEPROMs use supply voltages that are lower than supply voltages of electronic components coupled to such EEPROMs, such as MCUs, without limitation. This presents a problem, as a non-limiting example, when such lower supply voltages are outside operating windows of the other electronic components and/or tolerances thereof.

Consider two non-limiting examples, where a supply voltage is outside of a designed range (e.g., a 3.0 volt minimum). Such a condition could indicate a power loss/drop, early onset of failure within a power supply or other passive element on a circuit board, or external tampering with a design, without limitation.

As a first non-limiting example, assume a non-volatile memory (e.g., Flash memory or EEPROM, without limitation) and a microcontroller (MCU) configured to write system critical information within sections of the memory. When a supply voltage moves to 2.0 volts, the non-volatile memory is still within its range of operating voltages, but the MCU is outside its range of operating voltages. While the MCU may still "operate" at a 2.0 volt supply voltage, correct operation is not guaranteed, and its operation and the validity of the written information to the memory are not reliable.

As a second non-limiting example, assume an analog sensor IC generating sensor values. An analog sensor IC may generate sensor values while a supply voltage is outside its range of operating voltages, and such sensor values may not be reliable. For example, when a supply voltage moves to 2.8 volts, an MCU and EEPROM may be functional, however the information received from the analog sensor IC may not be reliable, and actions taken by the MCU based on the analog sensor IC output may be faulty.

The inventor of this disclosure appreciates that it may be desirable to have voltage lockout circuit with a user programmable threshold so, as non-limiting example, ranges of operating voltages of other electronic devices in an electronic system may be considered.

As used herein, the term "value" means a value or a range of values. As non-limiting examples, a value may be expressed as a single value, two values defining a minimum value and a maximum value of a range, or a first value and a second value that defines a +/− tolerance of the first value.

Figure 1:
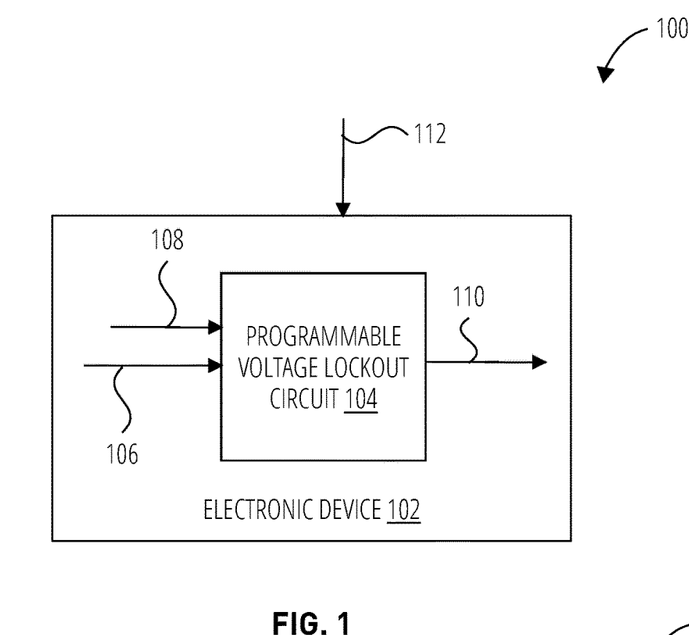
FIG. 1 is a block diagram depicting a circuit protected utilizing a programmable voltage lockout circuit, in accordance with one or more examples.

FIG. 1 is a block diagram depicting a circuit 100 protected utilizing a programmable voltage lockout circuit, in accordance with one or more examples. Circuit 100 includes a programmable voltage lockout circuit 104 provided at an electronic device 102.

Electronic device 102 may be any integrated circuit (IC). Various examples may find particular application in electronic devices that have a specified range of operating voltages defined by higher or lower limits than the respective limits of ranges of operating voltages of other electronic devices in a same electronic system as electronic device 102.

Programmable voltage lockout circuit 104 is configured, generally, to assert lockout 110 of electronic device 102 at least partially responsive to an indication 108 of supply voltage 112 of electronic device 102 and a user programmed threshold 106 programmed by a user (not depicted). Indication 108 may be supply voltage 112 or a digital or analog signal that indicates a voltage level of supply voltage 112. User programmed threshold 106 may be a digital or analog signal that represents a voltage level, above or below which programmable voltage lockout circuit 104 will either assert or de-assert lockout 110. In a case of protection from undervoltaged supply, programmable voltage lockout circuit 104 may assert lockout 110 responsive to supply voltage 112 exhibiting a voltage level below the user programmed threshold 106 and de-assert lockout 110 responsive to supply voltage 112 exhibiting a voltage level above the user programmed threshold 106. In a case of protection from overvoltage supply, programmable voltage lockout circuit 104 may assert lockout 110 responsive to supply voltage 112 exhibiting a voltage level above user programmed threshold 106 and de-assert lockout 110 responsive to supply voltage 112 exhibiting a voltage level below user programmed threshold 106. Lockout 110 may be de-asserted by a logic high, and be asserted by a logic low, or the reverse without exceeding the scope of this disclosure. Hysteresis may be provided without exceeding the scope of this disclosure.

Lockout 110 may be indicative of a state of programmable voltage lockout circuit 104, an operative signal that enables or disables circuits (e.g., an enablement signal, without limitation), or both. One or more of user programmed threshold 106, indication 108 and lockout 110 may be indicative of internal or external signals of programmable voltage lockout circuit 104 associated with its operation in various examples.

Figure 2:
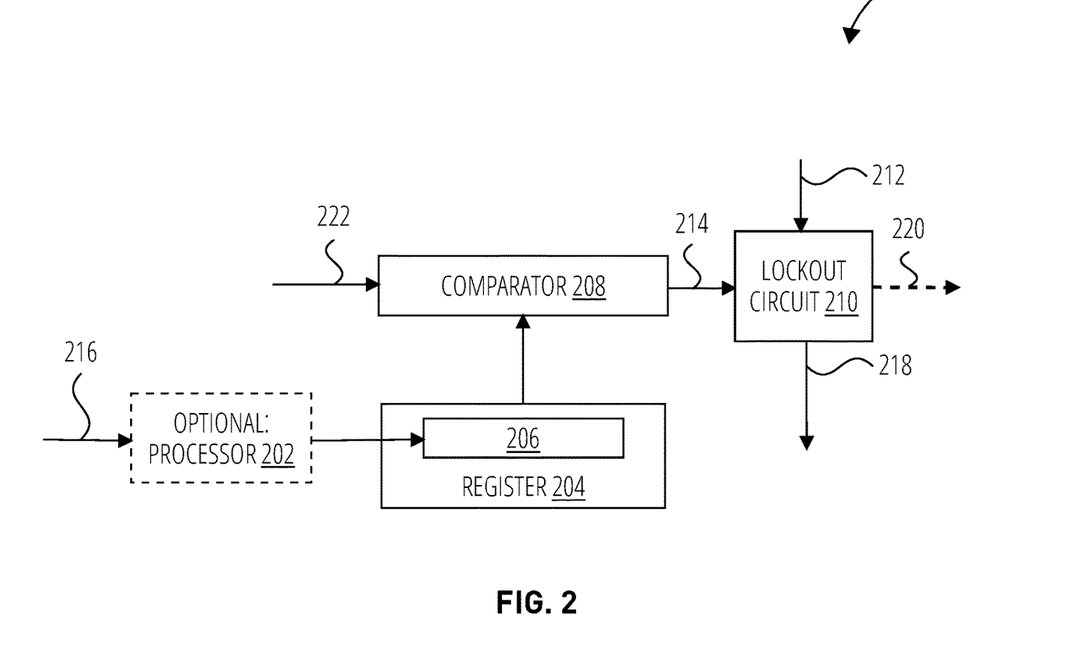
FIG. 2 is a block diagram depicting a programmable voltage lockout circuit in accordance with one or more examples.

FIG. 2 is a block diagram depicting a programmable voltage lockout circuit 200, in accordance with one or more examples. Programmable voltage lockout circuit 200 is a non-limiting example of programmable voltage lockout circuit 104 of FIG. 1.

Programmable voltage lockout circuit 200 is configured, generally, to assert a lockout responsive to a supply voltage 212 and an input value 216 provided by a user. In one or more examples, programmable voltage lockout circuit 200 includes optional processor 202 ("processor 202"), register 204, comparator 208 and lockout circuit 210.

In one or more examples, input value 216 is provided by a user, such as a designer of an electronic system, without limitation. In one or more examples, value 206 may be programmed at programmable voltage lockout circuit 200 directly, or programmed indirectly via processor 202. Processor 202 may be configured, generally, to assist a user (not depicted) to program value 206 at programmable voltage lockout circuit 200, and more specifically, set value 206 stored at register 204 to input value 216 provided by a user. In one or more examples, a user may be, as non-limiting examples, a designer, a system integrator, or a processing core of an electronic system that includes programmable voltage lockout circuit 200.

Comparator 208 is configured, generally, to generate state indication 214 responsive to level indication 222 and value 206 stored at register 204. Level indication 222 indicates a voltage level of supply voltage 212. Value 206 represents a user programmed threshold as set by input value 216. State indication 214 indicates a state of supply voltage 212, and more specifically, a relationship between a level of supply voltage 212 as indicated by level indication 222 and value 206. As a non-limiting example, a first relationship observed between level indication 222 and value 206 may be indicative of a first state of supply voltage 212, and a second relationship observed between level indication 222 and value 206 may be indicative of a second state of supply voltage 212. As further non-limiting examples, a first state may be indicative of appropriately voltaged supply and a second state may be indicative of undervoltaged or overvoltaged supply, as the case may be.

In one or more examples, comparator 208 may be configured to receive digital or analog representations of signals discussed herein. As a non-limiting example, level indication 222 may be represented by a voltage level of an analog voltage signal, and a digital-to-analog converter (not depicted) may be provided on a signal path between register 204 and a reference input of comparator 208 to convert a digital signal representing value 206 to an analog signal representing value 206. As a further non-limiting example, an analog-to-digital converter (not depicted) is provided on a signal path for level indication 222 to an input of comparator 208 to convert an analog signal representing the level indication 222 to a digital signal representing the level indication 222.

In one or more examples, comparator 208 may receive supply voltage 212 and level indication 222 may be an internal signal of comparator 208 generated by a signal detector. Such a signal detector may be configured to sense a voltage level of supply voltage 212 and generate an analog voltage signal that exhibits a voltage level representative of a voltage level of supply voltage 212.

Lockout circuit 210 is configured, generally, to assert and de-assert lockout responsive to state indication 214. In the specific non-limiting example depicted by FIG. 2, lockout circuit 210 is arranged to alternately enable or disable transfer of supply voltage 212 as transferred supply voltage 218, e.g., to an electronic device that includes programmable voltage lockout circuit 200, responsive to an observed relationship between a state of supply voltage 212, as indicated by level indication 222, and value 206, the observed relationship indicated by state indication 214 generated by comparator 208.

In one or more examples, programmable voltage lockout circuit 200 may be operable over a range of operating voltages that has a lower limit that is the same or lower than the lower limit on the range of operating voltages of an electronic device being protected, or the voltage level represented by the value 206 stored at register 204. In the case of the same range, utilizing programmable voltage lockout circuit 200 may effectively reduce the range of operating voltages of a protected device. In the case of a lower limit, utilizing programmable voltage lockout circuit 200 may have no (or inconsequential) effect on the range of operating voltages of a protected device or circuit.

Figure 3:
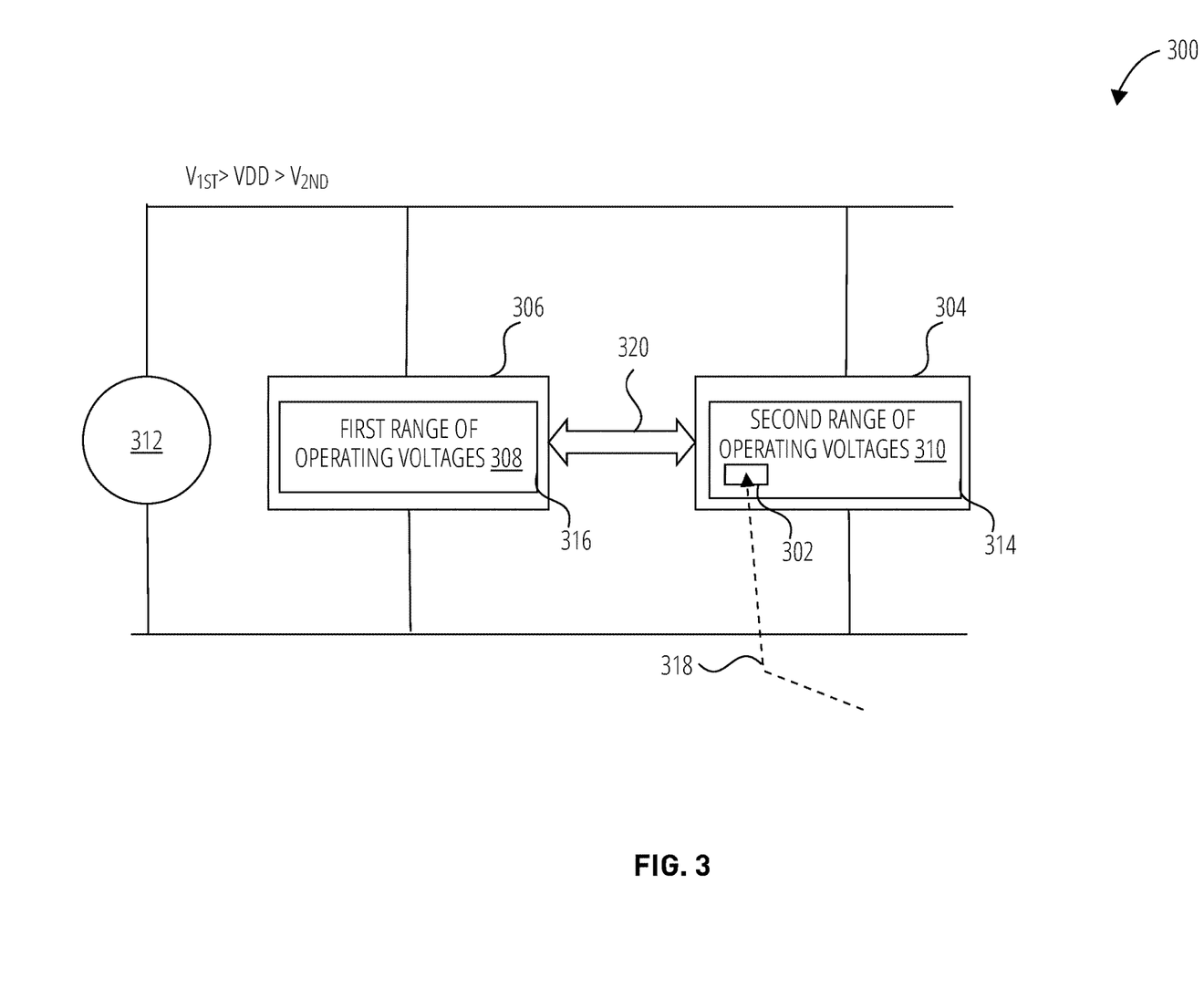
FIG. 3 is a block diagram depicting an electronic system that includes an electronic device protected by a programmable voltage lockout from potential invalid operation by another electronic device of the system, in accordance with one or more examples.

FIG. 3 is a block diagram depicting an electronic system 300 that includes an electronic device protected by a programmable voltage lockout from potential invalid operation by another electronic device of the system, in accordance with one or more examples.

Electronic system 300 includes first electronic device 306 and second electronic device 304, both supplied power by a common voltage supply 312 and that are operatively coupled to perform some operations of electronic system 300 that involve data transfer 320. Internal circuits 316 of first electronic device 306 have a first range of operating voltages 308 and internal circuits 314 of second electronic device 304 have a second range of operating voltages 310, which ranges of operating voltages are different.

Programmable voltage lockout circuit 302 utilizes a user programmed value 318 that corresponds to a desired voltage level, above or below which a voltage lock out of programmable voltage lockout circuit 302 will either assert or de-assert lockout at second electronic device 304, or internal circuits 314 of second electronic device 304. Accordingly, for a specific instance of user programmed value 318, a value of user programmed value 318 may be programmed to correspond to a value at which internal circuits 316 of first electronic device 306 are presumed to operate validly or invalidly. Notably, disclosed programmable voltage lockout circuits may be programmed to lockout when a supply voltage is detected to be outside a range of operating voltages of an electronic device or circuit at which the programmable voltage lockout circuit is provided, or to lockout when a supply voltage is detected to be outside range of operating voltages of a different electronic device or circuit than the one at which the programmable voltage lockout circuit is provided.

In the specific non-limiting example depicted by FIG. 3, the voltage level of the supply voltage VDD is below a lower limit of first range of operating voltages 308 and above a lower limit of second range of operating voltages 310. Accordingly, internal circuits 314 of second electronic device 304 are presumed to operate validly, while internal circuits 316 of first electronic device 306 are presumed to operate invalidly. User programmed value 318 is set to a value that is above VDD's current level, and so programmable voltage lockout circuit 302 may assert lockout of internal circuits 314 of second electronic device 304 to protect against invalid data transfers 320 by first electronic device 306, or internal circuits 316 of first electronic device 306 (e.g., invalid writes to second electronic device 304, or internal circuits 314 of second electronic device 304, without limitation).

Figure 4:
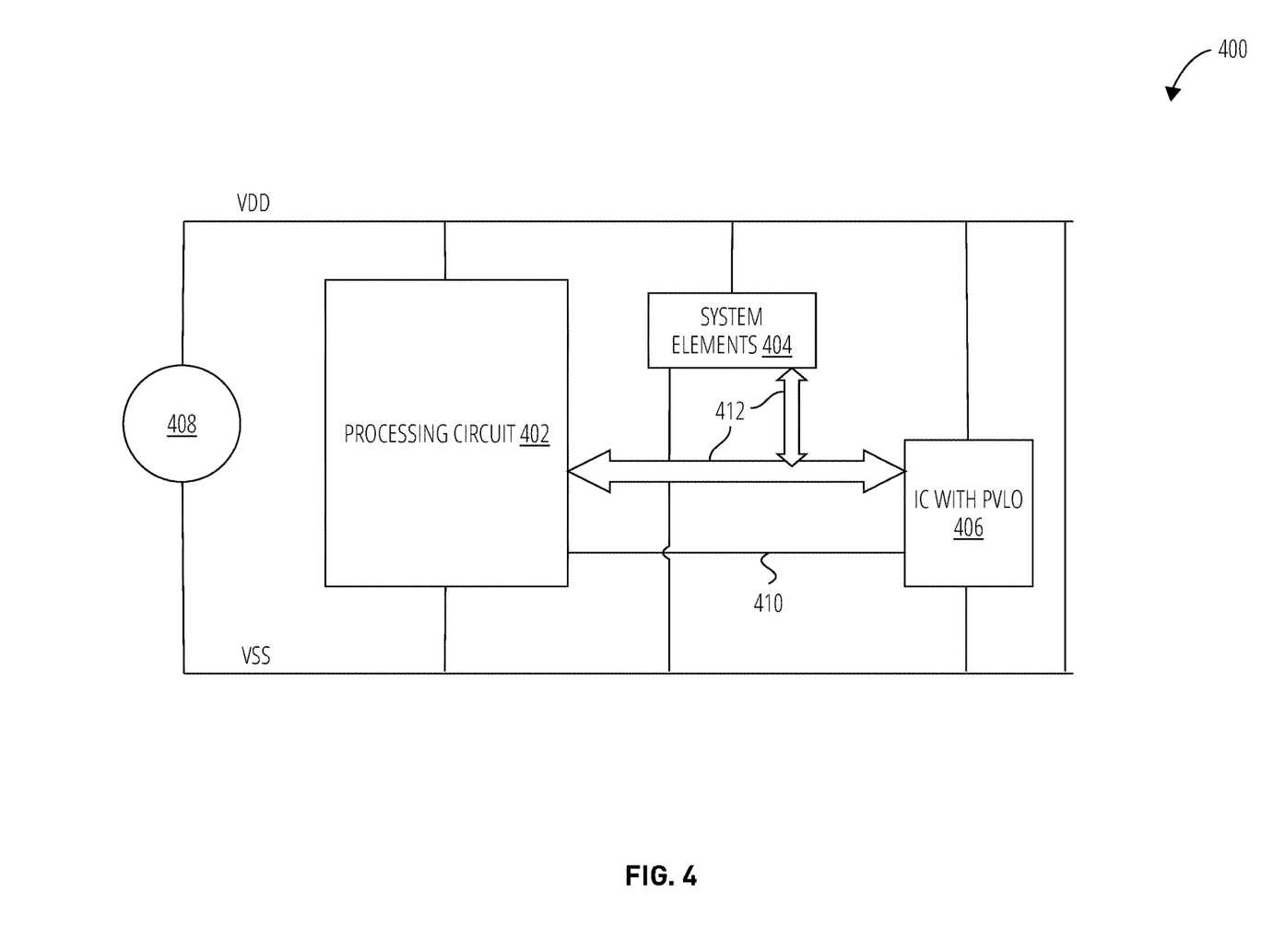
FIG. 4 is a block diagram depicting an electronic system illustrating a non-limiting example of a specific use case.

Turning back to FIG. 2, in one or more examples, programmable voltage lockout circuit 200 may include an optional indication 220 for indicating a state of lockout circuit 210, a state of an electronic device or circuit being protected by programmable voltage lockout circuit 200 or a state of supply voltage. FIG. 4 is a block diagram depicting an electronic system 400 illustrating a specific use case for indication 220. IC with programmable voltage lockout circuit 406 (sometimes referred to "PVLO 406")communicates with system elements 404 via data bus 412 to perform some operations of electronic system 400 that is under the control of processing circuit 402. Processing circuit 402 may be, as a non-limiting example, a microcontroller, a computer integrated onto an IC, a processing core of an embedded system, or a programmable state machine, without limitation. IC with PVLO 406 communicates with processing circuit 402 via local connection 410. If supply voltages VDD or VSS generated by voltage supply 408 exhibit voltage levels outside programmed thresholds, then IC with programmable voltage lockout circuit 406 may inform processing circuit 402 via local connection 410.

As a non-limiting example, local connection 410 may be coupled to a pin (pin not shown) of IC with programmable voltage lockout circuit 406 that is asserted/de-asserted by respective assertions/de-assertions of indication 220 and coupled to an interrupt or signal detector (interrupt or signal detector not shown) coupled to a register of processing circuit 402. When indication 220 is asserted, the interrupt of processing circuit 402 is asserted via local connection 410 or the signal detector output indicates a valid signal was a detected and that indication is stored at the register. Either way, local connection 410 and the programmable voltage lockout circuit of IC with programmable voltage lockout circuit 406 provide a mechanism to inform processing circuit 402 about the state of the IC with programmable voltage lockout circuit 406, a state of system elements 404, or both, without limitation. By way of non-limiting example, upon assertion of indication 220, processing circuit 402 is aware that the output of system elements 404 may be invalid.

Figure 5:
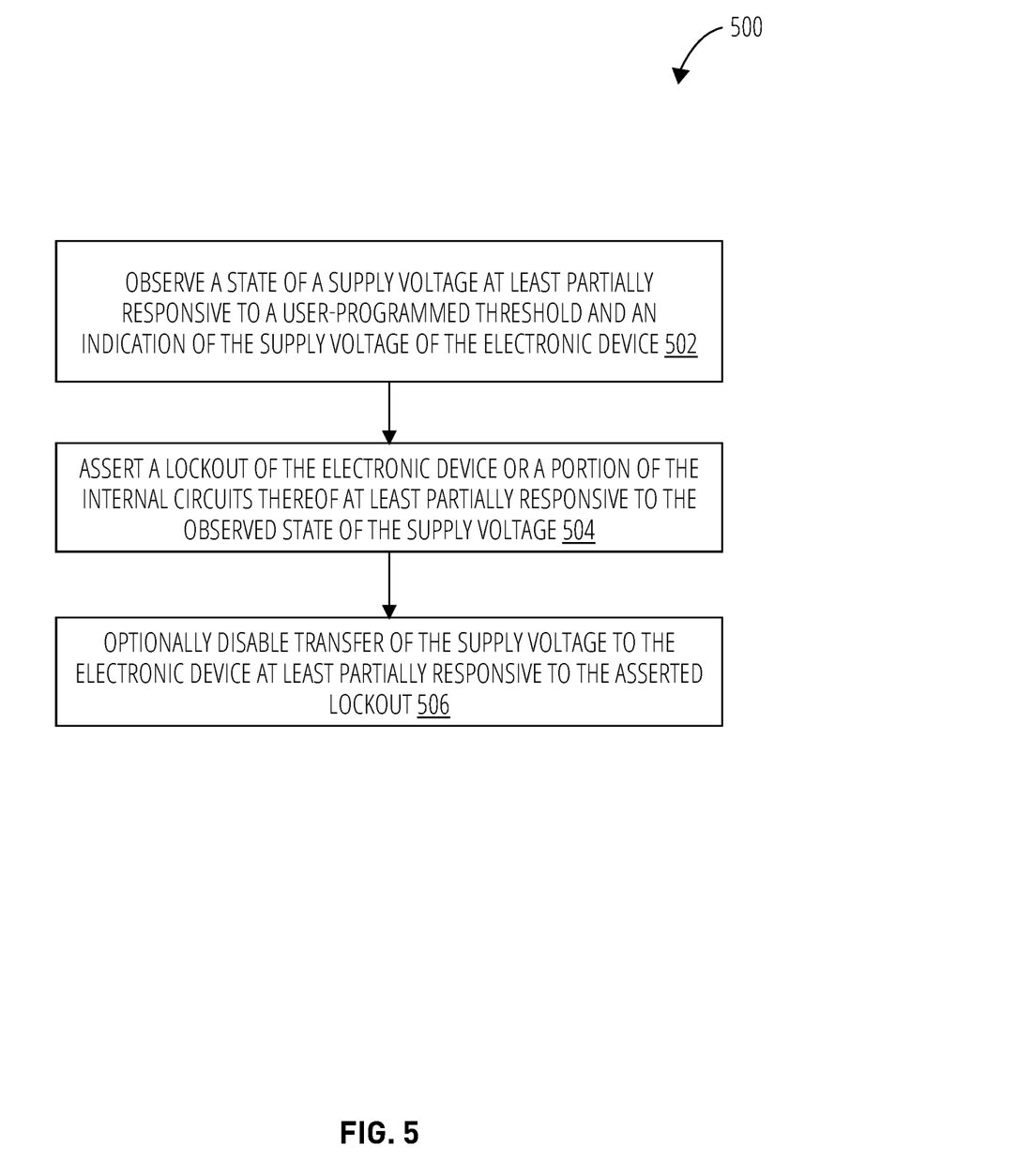
FIG. 5 is a flow diagram depicting a process for protecting an electronic device utilizing a programmable voltage lockout circuit, in accordance with one or more examples.

FIG. 5 is a flow diagram depicting a process 500 for protecting an electronic device utilizing a programmable voltage lockout, in accordance with one or more examples.

At operation 502, process 500 observes a state of a supply voltage at least partially responsive to a user-programmed threshold and an indication of the supply voltage of the electronic device. In one or more examples, a user-programmed threshold may be provided by a user via a configuration tool for design of electronic circuits and ICs utilizing a design element such as an Intellectual Property (IP) core, without limitation.

At operation 504, process 500 asserts a lockout of the electronic device at least partially responsive to the observed state of the supply voltage. In one or more examples, lockout may include lockout of an entire electronic device or a portion of the internal circuits thereof. In one or more examples, internal circuits of an electronic device affected by lockout may, or may not, include the programmable voltage lockout circuit.

At operation 506, process 500 optionally disables transfer of the supply voltage to the electronic device, or a portion of the internal circuits thereof, at least partially responsive to the asserted lockout.

Figure 6:
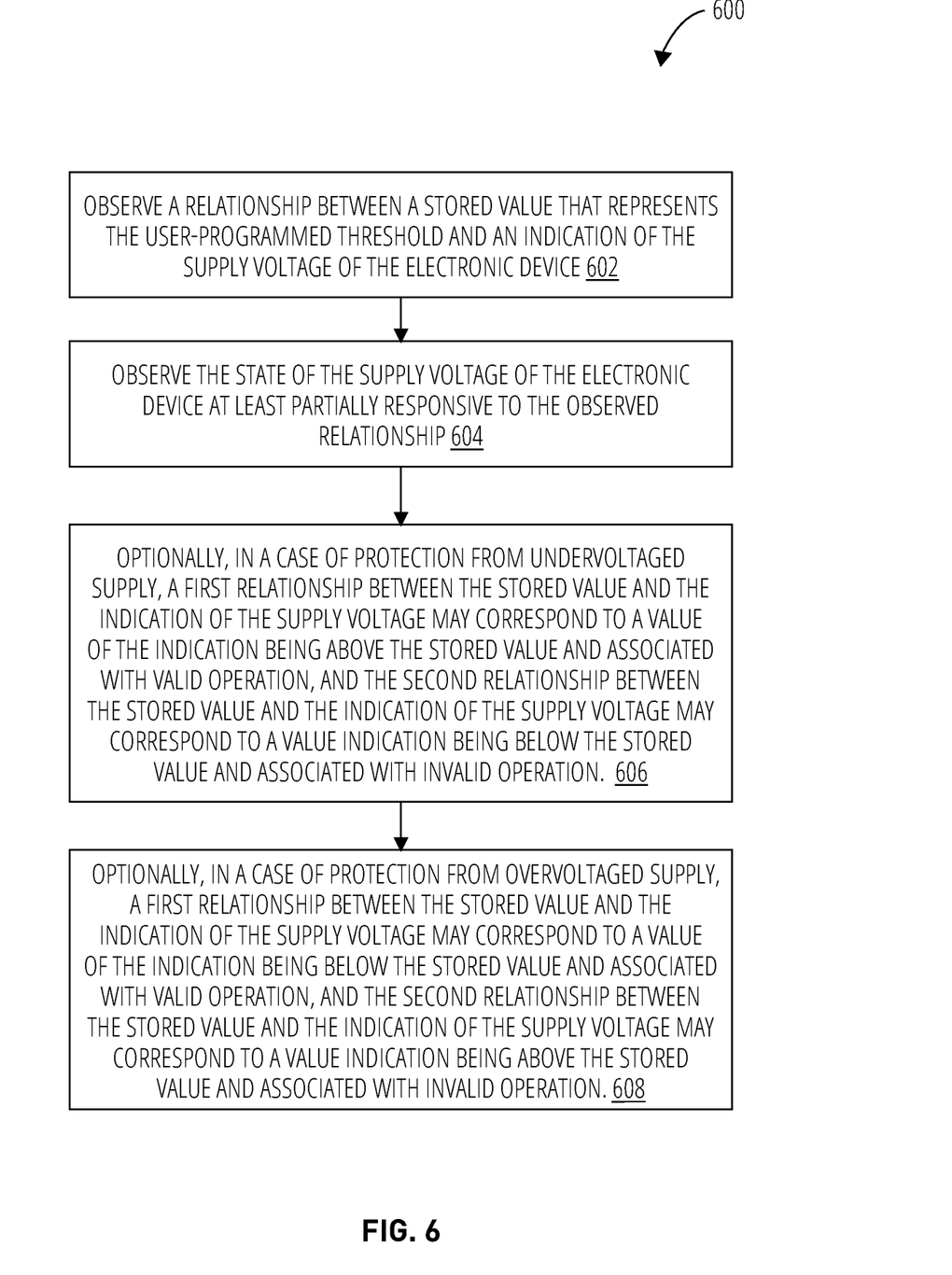
FIG. 6 is a flow diagram depicting a process for observing the state of a supply voltage, in accordance with one or more examples.

FIG. 6 is a flow diagram depicting a process 600 for observing the state of a supply voltage, in accordance with one or more examples.

At operation 602, process 600 observes a relationship between a stored value that represents the user-programmed threshold and an indication of the supply voltage of the electronic. In one or more examples, the stored value may be value 206 stored at register 204 of FIG. 2.

At operation 604, process 600 observes the state of the supply voltage of the electronic device at least partially responsive to the observed relationship.

At operation 606, optionally, in a case of protection from undervoltaged supply, a first relationship between the stored value and the indication of the supply voltage may correspond to a value of the indication being above the stored value and associated with valid operation, and the second relationship between the stored value and the indication of the supply voltage may correspond to a value indication being below the stored value and associated with invalid operation.

At operation 608, optionally, in a case of protection from overvoltaged supply, a first relationship between the stored value and the indication of the supply voltage may correspond to a value of the indication being below the stored value and associated with valid operation, and the second relationship between the stored value and the indication of the supply voltage may correspond to a value indication being above the stored value and associated with invalid operation.

Figure 7:
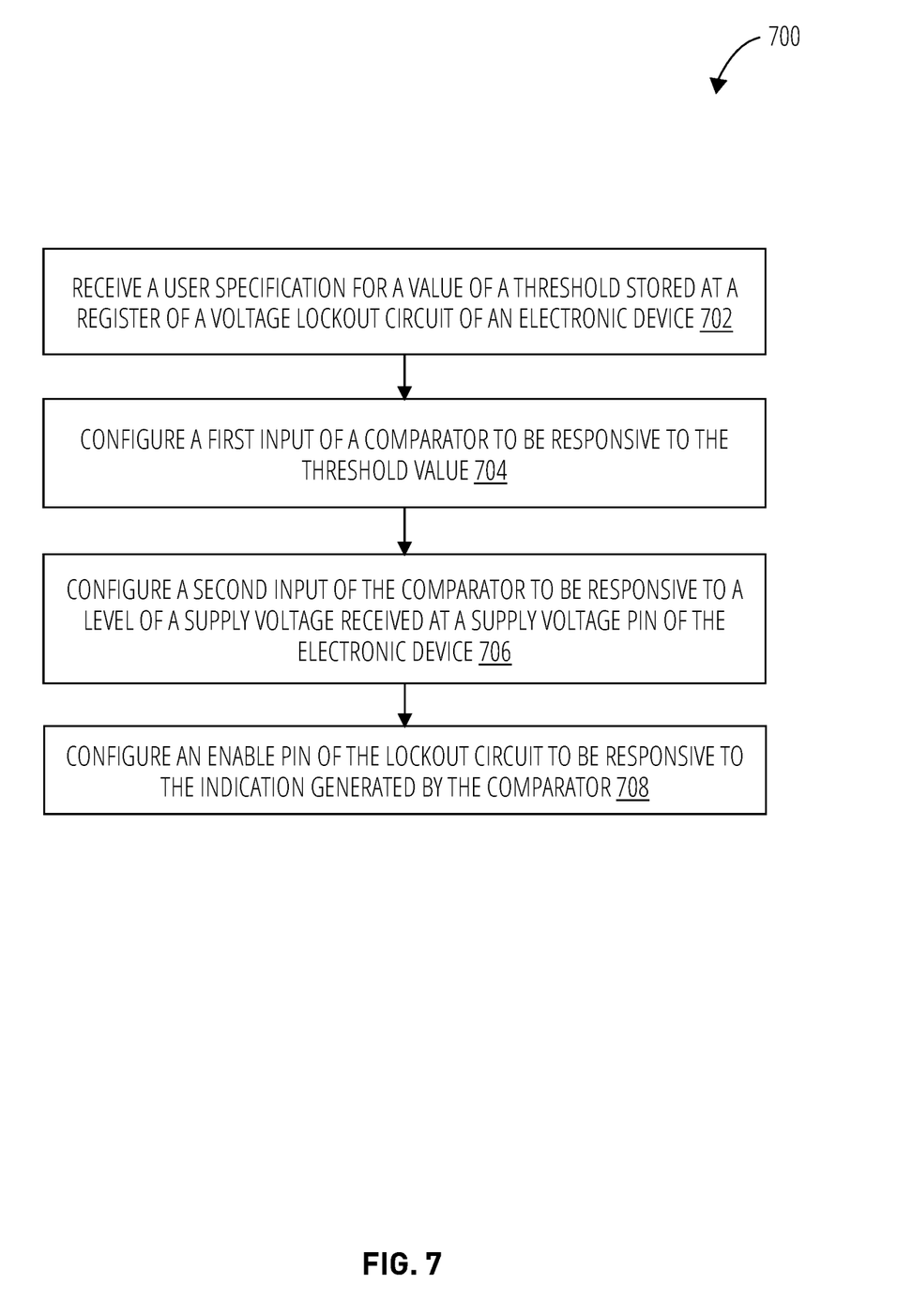
FIG. 7 is a flow diagram depicting a process in accordance with one or more examples.

FIG. 7 is a flow diagram depicting a process 700 in accordance with one or more examples. Process 700 is a process for configuring a circuit as a programmable voltage lockout circuit of an electronic device, in accordance with one or more examples. Such a circuit may include a register to store a threshold; a comparator to generate an indication for a state of a voltage signal at an input of the comparator; and a lockout circuit to assert a lockout of the electronic device.

At operation 702, process 700 receives a user specification for a value of the threshold stored at the register of a programmable voltage lockout circuit of an electronic device. At operation 704, process 700 configures a first input of the comparator to be responsive to the threshold value. At operation 706, process 700 configures a second input of the comparator to be responsive to a level of a supply voltage received at a supply voltage pin of the electronic device. Upon configuring of the first input of the comparator according to operation 704, the first input may be operable as a reference input of the comparator. Upon configuring of the second input of the comparator according to operation 706, the second input may be operable as a voltage input of the comparator. At operation 708, process 700 configures an output of the lockout circuit to be responsive to the indication generated by the comparator. Upon configuring of the output of the lockout circuit according to operation 708, the lockout circuit may be operable to assert a lockout of an electronic device on the output, which output may be an output pin, which output may be coupled to an enable input of the electronic device, responsive to a state of a voltage signal received at the second input of the comparator. A state of the voltage signal may be determined at least partially responsive to a user specification for a value of the threshold stored at the register of a programmable voltage lockout circuit of an electronic device.

Figure 8:
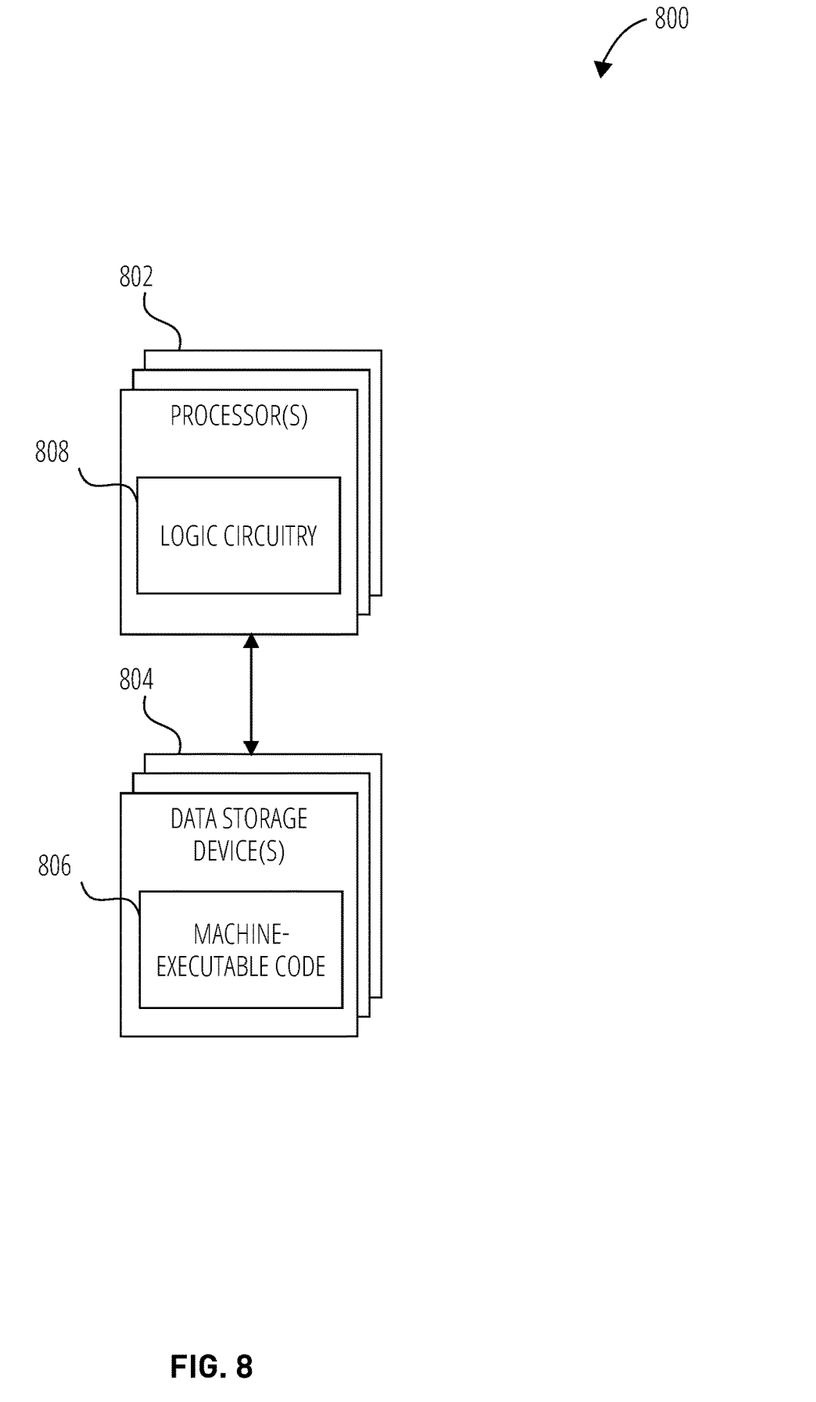
FIG. 8 is a block diagram of a circuitry configured to implement functional elements discussed herein, in accordance with one or more examples.

It will be appreciated by those of ordinary skill in the art that functional elements of embodiments disclosed herein (e.g., functions, operations, acts, processes, and/or methods) may be implemented in any suitable hardware, software, firmware, or combinations thereof. FIG. 8 illustrates non-limiting examples of implementations of functional elements disclosed herein. In some embodiments, some or all portions of the functional elements disclosed herein may be performed by hardware specially configured for carrying out the functional elements.

FIG. 8 is a block diagram of circuitry 800 that, in some embodiments, may be used to implement various functions, operations, acts, processes, and/or methods disclosed herein. The circuitry 800 includes one or more processors 802 (sometimes referred to herein as "processors 802") operably coupled to one or more data storage devices (sometimes referred to herein as "storage 804"). The storage 804 includes machine-executable code 806 stored thereon and the processors 802 include logic circuitry 808. The machine-executable code 806 includes information describing functional elements that may be implemented by (e.g., performed by) the logic circuitry 808. The logic circuitry 808 is adapted to implement (e.g., perform) the functional elements described by the machine-executable code 806. The circuitry 800, when executing the functional elements described by the machine-executable code 806, should be considered as special purpose hardware configured for carrying out functional elements disclosed herein. In some embodiments the processors 802 may be configured to perform the functional elements described by the machine-executable code 806 sequentially, concurrently (e.g., on one or more different hardware platforms), or in one or more parallel process streams.

When implemented by logic circuitry 808 of the processors 802, the machine-executable code 806 is configured to adapt the processors 802 to perform operations of embodiments disclosed herein. For example, the machine-executable code 806 may be configured to adapt the processors 802 to perform at least a portion or a totality of the features and functions discussed with reference to electronic device 102 or programmable voltage lockout circuit 104 of FIG. 1, processor 202, register 204, comparator 208 or lockout circuit 210 of FIG. 2, second electronic device 304, first electronic device 306, internal circuits 316, internal circuits 314, or common voltage supply 312 of FIG. 3, or IC with PVLO 406, system elements 404, data bus 412, local connection 410, processing circuit 402 or voltage supply 408 of FIG. 4. As another example, the machine-executable code 806 may be configured to adapt the processors 802 to perform at least a portion or a totality of the operations discussed for process 500, process 600, or process 700.

The processors 802 may include a general purpose processor, a special purpose processor, a central processing unit (CPU), a microcontroller, a programmable logic controller (PLC), a digital signal processor (DSP), an application specific integrated circuit (ASIC), a field-programmable gate array (FPGA) or other programmable logic device, discrete gate or transistor logic, discrete hardware components, other programmable device, or any combination thereof designed to perform the functions disclosed herein. A general-purpose computer including a processor is considered a special-purpose computer while the general-purpose computer is configured to execute functional elements corresponding to the machine-executable code 806 (e.g., software code, firmware code, hardware descriptions) related to embodiments of the present disclosure. It is noted that a general-purpose processor (may also be referred to herein as a host processor or simply a host) may be a microprocessor, but in the alternative, the processors 802 may include any conventional processor, controller, microcontroller, or state machine. The processors 802 may also be implemented as a combination of computing devices, such as a combination of a DSP and a microprocessor, a plurality of microprocessors, one or more microprocessors in conjunction with a DSP core, or any other such configuration.

In some embodiments the storage 804 includes volatile data storage (e.g., random-access memory (RAM)), non-volatile data storage (e.g., Flash memory, a hard disc drive, a solid-state drive, erasable programmable read-only memory (EPROM), etc.). In some embodiments the processors 802 and the storage 804 may be implemented into a single device (e.g., a semiconductor device product, a system on chip (SOC), etc.). In some embodiments the processors 802 and the storage 804 may be implemented into separate devices.

In some embodiments the machine-executable code 806 may include computer-readable instructions (e.g., software code, firmware code). By way of non-limiting example, the computer-readable instructions may be stored by the storage 804, accessed directly by the processors 802, and executed by the processors 802 using at least the logic circuitry 808. Also by way of non-limiting example, the computer-readable instructions may be stored on the storage 804, transferred to a memory device (not shown) for execution, and executed by the processors 802 using at least the logic circuitry 808. Accordingly, in some embodiments the logic circuitry 808 includes electrically configurable logic circuitry 808.

In some embodiments the machine-executable code 806 may describe hardware (e.g., circuitry) to be implemented in the logic circuitry 808 to perform the functional elements. This hardware may be described at any of a variety of levels of abstraction, from low-level transistor layouts to high-level description languages. At a high-level of abstraction, a hardware description language (HDL) such as an IEEE Standard hardware description language (HDL) may be used. By way of non-limiting examples, VERILOG™, SYSTEMVERILOG™ or very large-scale integration (VLSI) hardware description language (VHDL) may be used.

HDL descriptions may be converted into descriptions at any of numerous other levels of abstraction as desired. As a non-limiting example, a high-level description can be converted to a logic-level description such as a register-transfer language (RTL), a gate-level (GL) description, a layout-level description, or a mask-level description. As a non-limiting example, micro-operations to be performed by hardware logic circuits (e.g., gates, flip-flops, registers, without limitation) of the logic circuitry 808 may be described in a RTL and then converted by a synthesis tool into a GL description, and the GL description may be converted by a placement and routing tool into a layout-level description that corresponds to a physical layout of an integrated circuit of a programmable logic device, discrete gate or transistor logic, discrete hardware components, or combinations thereof. Accordingly, in some embodiments the machine-executable code 806 may include an HDL, an RTL, a GL description, a mask level description, other hardware description, or any combination thereof.

In embodiments where the machine-executable code 806 includes a hardware description (at any level of abstraction), a system (not shown, but including the storage 804) may be configured to implement the hardware description described by the machine-executable code 806. By way of non-limiting example, the processors 802 may include a programmable logic device (e.g., an FPGA or a PLC) and the logic circuitry 808 may be electrically controlled to implement circuitry corresponding to the hardware description into the logic circuitry 808. Also by way of non-limiting example, the logic circuitry 808 may include hard-wired logic manufactured by a manufacturing system (not shown, but including the storage 804) according to the hardware description of the machine-executable code 806.

Regardless of whether the machine-executable code 806 includes computer-readable instructions or a hardware description, the logic circuitry 808 is adapted to perform the functional elements described by the machine-executable code 806 when implementing the functional elements of the machine-executable code 806. It is noted that although a hardware description may not directly describe functional elements, a hardware description indirectly describes functional elements that the hardware elements described by the hardware description are capable of performing.

As used in the present disclosure, the term "combination" with reference to a plurality of elements may include a combination of all the elements or any of various different subcombinations of some of the elements. For example, the phrase "A, B, C, D, or combinations thereof" may refer to any one of A, B, C, or D; the combination of each of A, B, C, and D; and any subcombination of A, B, C, or D such as A, B, and C; A, B, and D; A, C, and D; B, C, and D; A and B; A and C; A and D; B and C; B and D; or C and D.

Terms used in the present disclosure and especially in the appended claims (e.g., bodies of the appended claims, without limitation) are generally intended as "open" terms (e.g., the term "including" should be interpreted as "including, but not limited to," the term "having" should be interpreted as "having at least," the term "includes" should be interpreted as "includes, but is not limited to," without limitation). As used herein, the term "each" means some or a totality. As used herein, the term "each and every" means a totality.

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more," without limitation); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations, without limitation). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additional non-limiting examples of the disclosure include:

Example 1: An apparatus, comprising: a programmable voltage lockout circuit provided at an electronic device to assert a lockout of the electronic device at least partially responsive to a user-programmed threshold and a supply voltage of the electronic device.

Example 2: The apparatus according to Example 1, wherein the programmable voltage lockout circuit comprises: a register to store a value.

Example 3: The apparatus according to any of Examples 1 and 2, wherein the programmable voltage lockout circuit comprises: a processor to receive a value from a user and set the value stored at the register at least partially responsive to the value received from the user.

Example 4: The apparatus according to any of Examples 1 through 3, wherein the programmable voltage lockout circuit comprises: a comparator to observe a state of the supply voltage of the electronic device at least partially responsive to the value stored at the register and generate an indication of the state of the supply voltage.

Example 5: The apparatus according to any of Examples 1 through 4, wherein the comparator observes a relationship between the value stored at the register and an indication of the supply voltage of the electronic device.

Example 6: The apparatus according to any of Examples 1 through 5, wherein the comparator: observes the state of the supply voltage is a first state responsive to observing a first relationship between the value stored at the register and the indication of the supply voltage of the electronic device; and observes the state of the supply voltage is a second state responsive to observing a second relationship between the value stored at the register and the indication of the supply voltage of the electronic device.

Example 7: The apparatus according to any of Examples 1 through 6, wherein one of the first state and the second state corresponds to an undervoltaged supply.

Example 8: The apparatus according to any of Examples 1 through 7, wherein one of the first state and the second state corresponds to an overvoltaged supply.

Example 9: The apparatus according to any of Examples 1 through 8, wherein the programmable voltage lockout circuit comprises: a lockout circuit to alternately enable or disable transfer of the supply voltage to the electronic device at least partially responsive to the indication of the state of the supply voltage generated by the comparator.

Example 10: The apparatus according to any of Examples 1 through 9, comprising an indicator to generate an indication of a state of the lockout circuit.

Example 11: A method, comprising: observing a state of a supply voltage of an electronic device at least partially responsive to a user-programmed threshold; and asserting a lockout of the electronic device at least partially responsive to the state of the supply voltage.

Example 12: The method according to Example 11, comprising: observing a relationship between a stored value that represents the user-programmed threshold and an indication of the supply voltage of the electronic device; and observing the state of the supply voltage of the electronic device at least partially responsive to the relationship.

Example 13: The method according to any of Examples 11 and 12, comprising: observing the state of the supply voltage is a first state responsive to observing a first relationship between the stored value and the indication of the supply voltage of the electronic device; and observing the state of the supply voltage is a second state responsive to observing a second relationship between the stored value and the indication of the supply voltage of the electronic device.

Example 14: The method according to any of Examples 11 through 13, wherein one of the first state and the second state corresponds to an undervoltaged supply.

Example 15: The method according to any of Examples 11 through 14, wherein one of the first state and the second state corresponds to an overvoltaged supply.

Example 16: The method according to any of Examples 11 through 15, comprising: disabling transfer of the supply voltage to the electronic device at least partially responsive to the asserting the lockout of the electronic device.

Example 17: An electronic system, comprising: a first electronic device and a second electronic device, wherein respective internal circuits of the first electronic device and the second electronic device are configured to operate according to different ones of ranges of operating voltages; and a programmable voltage lockout circuit provided at the second electronic device to assert a lockout of the second electronic device at least partially responsive to observing an indication that a supply voltage of a common voltage supply is outside a range of operating voltages of the respective internal circuits of the first electronic device.

Example 18: The electronic system according to Example 17, wherein the programmable voltage lockout circuit includes a value programmed by a user.

Example 19: A method comprising: receiving a user specification for a value of a threshold stored at a register of a voltage lockout circuit of an electronic device; configuring a first input of a comparator to be responsive to the threshold; configuring a second input of the comparator to be responsive to a level of a supply voltage received at a supply voltage pin of the electronic device; and configuring an output of the lockout circuit to be responsive to an indication generated by the comparator.

Example 20: The method according to Example 19, wherein the receiving the user specification comprises receiving the specification directly, or comprises receiving the specification indirectly via a processor.

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventor.

What is claimed is:

1. An apparatus, comprising:
   a programmable voltage lockout circuit provided at an electronic device to assert a lockout of the electronic device at least partially responsive to an indication of state of supply voltage of the electronic device, wherein the programmable voltage lockout circuit comprises:
   a register to store a user-programmed threshold; and
   a comparator to set the indication of state of supply voltage at least partially responsive to the value the user-programmed threshold stored at the register and an indication of supply voltage of the electronic device.

2. The apparatus of claim 1, comprising:
   a processor to set a value of the user-programmed threshold stored at the register at least partially based on an imput value.

3. The apparatus of claim 2, wherein the processor to receive the input value from a user.

4. The aparatus of claim 1, wherein comparator to:
   observe a relationship between the user-programmed threshold stored at the register and the indication of the supply voltage of the electronic device; and
   set the indication of state of supply voltage at least partially responsive to the observed relationship.

5. The apparatus of claim 4, wherein the comparator to:
   set the indication of state of supply voltage to indicate a first state of supply voltage at least partially responsive to the observed relationship being a first relationship; and set the indication of state of supply voltage indicate a second state of supply voltage at least partially responsive to the observed relationship being a second relationship, wherein the first relationship and the second relationship are different.

6. The apparatus of claim 5, wherein the first state of supply voltage corresponds to an undervoltaged supply.

7. The apparatus of claim 5, wherein the second state of supply voltage corresponds to an overvoltaged supply.

8. The apparatus of claim 1, wherein the programmable voltage lockout circuit comprises:
a lockout circuit to alternately enable or disable transfer of supply voltage to the electronic device at least partially responsive to the indication of state of supply voltage.

9. The apparatus of claim 1, comprising an indicator to generate an indication of state of the programmable voltage lockout circuit.

10. The apparatus of claim 1, wherein the programmable voltage lockout circuit to:
assert the lockout of the electronic device at least partially responsive to the indication of state of supply voltage being set to indicate a first state of supply voltage; and
de-assert the lockout of the electronic device at least partially responsive to the indication of state of supply voltage being set to indicate a second state of supply voltage, wherein the first state of supply voltage and the second state of supply voltage are different.

11. A method, comprising:
observing a relationship between a stored value that represents a user-programmed threshold and an indication of a supply voltage of an electronic device;
observing a state of the supply voltage of the electronic device at least partially responsive to the relationship; and
asserting a lockout of the electronic device at least partially responsive to the state of the supply voltage.

12. The method of claim 11, comprising:
observing the state of the supply voltage is a first state responsive to observing a first relationship between the stored value and the indication of the supply voltage of the electronic device; and
observing the state of the supply voltage is a second state responsive to observing a second relationship between the stored value and the indication of the supply voltage of the electronic device.

13. The method of claim 12, wherein one of the first state and the second state corresponds to an undervoltaged supply.

14. The method of claim 12, wherein one of the first state and the second state corresponds to an overvoltaged supply.

15. The method of claim 11, comprising:
disabling transfer of the supply voltage to the electronic device at least partially responsive to the asserting the lockout of the electronic device.

16. An electronic system, comprising:
a first electronic device and a second electronic device, wherein respective internal circuits of the first electronic device and the second electronic device are configured to operate according to different ones of ranges of operating voltages; and
a programmable voltage lockout circuit provided at the second electronic device to assert a lockout of the second electronic device at least partially responsive to observing an indication that a supply voltage of a common voltage supply is outside a range of operating voltages of the respective internal circuits of the first electronic device.

17. The electronic system of claim 16, wherein the programmable voltage lockout circuit includes a value programmed by a user.

18. The electronic system of claim 16, wherein the programmable voltage lockout circuit provided at the second electronic device comprises:
a comparator to set the indication that the supply voltage of the common voltage supply is outside the range of operating voltages of the respective internal circuits of the first electronic device at least partially responsive to a user-programmed range of operating voltages of respective internal circuits of the first electronic device and an indication of supply voltage of the common voltage supply.

19. The electronic system of claim 18, wherein the comparator having:
a first input to receive the user-programmed range of operating voltages of respective internal circuits of the first electronic device and an indication of supply voltage of the common voltage supply; and
a second input to receive the indication of supply voltage of the common voltage supply.

20. The electronic system of claim 19, wherein:
the first input of the comparator is responsive to a value of the user-programmed range of operating voltages of the respective internal circuits of the first electronic device stored at a register; and
the second input of the comparator is responsive to a voltage level of a supply voltage pin of the second electronic device.

21. The electronic system of claim 16, wherein the range of operating voltages of the respective internal circuits of the first electronic device is settable responsive to a user-programmed value.

22. The electronic system of claim 16, wherein the programmable voltage lockout circuit provided at the second electronic device to de-assert the lockout of the second electronic device at least partially responsive to observing an indication that a supply voltage of a common voltage supply is within a range of operating voltages of the respective internal circuits of the first electronic device.

23. The electronic system of claim 16, wherein a range of operating voltages of respective internal circuits of the second electronic device is wider than the range of operating voltages of the respective internal circuits of the first electronic device.

24. A method comprising:
receiving a user specification for a value of a threshold stored at a register of a voltage lockout circuit of an electronic device;
configuring a first input of a comparator to be responsive to the threshold;
configuring a second input of the comparator to be responsive to a level of a supply voltage received at a supply voltage pin of the electronic device; and
configuring an output of the voltage lockout circuit to be responsive to an indication generated by the comparator.

25. The method of claim 24, wherein the receiving the user specification comprises receiving the user specification directly, or comprises receiving the user specification indirectly via a processor.

* * * * *

UNITED STATES PATENT AND TRADEMARK OFFICE
CERTIFICATE OF CORRECTION

PATENT NO. : 11,929,604 B2
APPLICATION NO. : 17/443080
DATED : March 12, 2024
INVENTOR(S) : Daniel Harfert It is certified that error appears in the above-identified patent and that said Letters Patent is hereby corrected as shown below:

In the Specification
Column 7, Line 65, change "referred to "PVLO 406")communicates" to --referred to as "PVLO 406") communicates--

In the Claims
Claim 1, Column 14, Lines 48-49, change "to the value the user-programmed" to --to the user-programmed--
Claim 2, Column 14, Lines 53-54, change "based on an imput value." to --based on an input value.--
Claim 4, Column 14, Line 57, change "The aparatus of" to --The apparatus of--
Claim 4, Column 14, Line 57, change "wherein comparator" to --wherein the comparator--

Signed and Sealed this
Thirtieth Day of July, 2024

Katherine Kelly Vidal
*Director of the United States Patent and Trademark Office*